US 11,242,944 B1

(12) United States Patent
Leger et al.

(10) Patent No.: US 11,242,944 B1
(45) Date of Patent: Feb. 8, 2022

(54) MID-PIPE PULLING DEVICE SYSTEMS AND METHODS

(71) Applicant: Trinity Bay Equipment Holdings, LLC, Houston, TX (US)

(72) Inventors: John Paul Leger, Baytown, TX (US); Ashesh Srivastava, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/329,398

(22) Filed: May 25, 2021

Related U.S. Application Data

(60) Provisional application No. 63/054,909, filed on Jul. 22, 2020.

(51) Int. Cl.
*F16L 1/06* (2006.01)
*F16L 1/036* (2006.01)

(52) U.S. Cl.
CPC ............. *F16L 1/06* (2013.01); *F16L 1/036* (2013.01)

(58) Field of Classification Search
CPC . F16L 1/036; F16L 1/032; F16L 1/024; F16L 3/02; F16L 1/06
See application file for complete search history.

(56) References Cited

U.S. PATENT DOCUMENTS

| 5,205,671 | A | * | 4/1993 | Handford | .................. | E21B 7/30 |
| | | | | | | 175/62 |
| 2002/0044837 | A1 | * | 4/2002 | Paletta | .................... | E03F 5/022 |
| | | | | | | 405/184.3 |

* cited by examiner

*Primary Examiner* — Sean D Andrish
(74) *Attorney, Agent, or Firm* — Conrad J. Hsu

(57) ABSTRACT

Techniques for implementing and/or operating a pipe deployment system including pipe deployment equipment, in which a pipe drum having spooled thereon a pipe segment is to be loaded on the pipe deployment equipment, and a pulling device to be secured to an unspooled section of the pipe segment to enable pulling force to be exerted thereon. The pulling device includes a first device leg, a second device leg parallel to the first device leg, and a device base extending between and secured the first device leg and the second device leg such that the device base is perpendicular to the first device leg and the second device leg and the device base is raised relative to a bottom surface of the first device leg and a bottom surface of the second device leg, in which the unspooled section of the pipe segment is to be disposed on the device base.

11 Claims, 7 Drawing Sheets

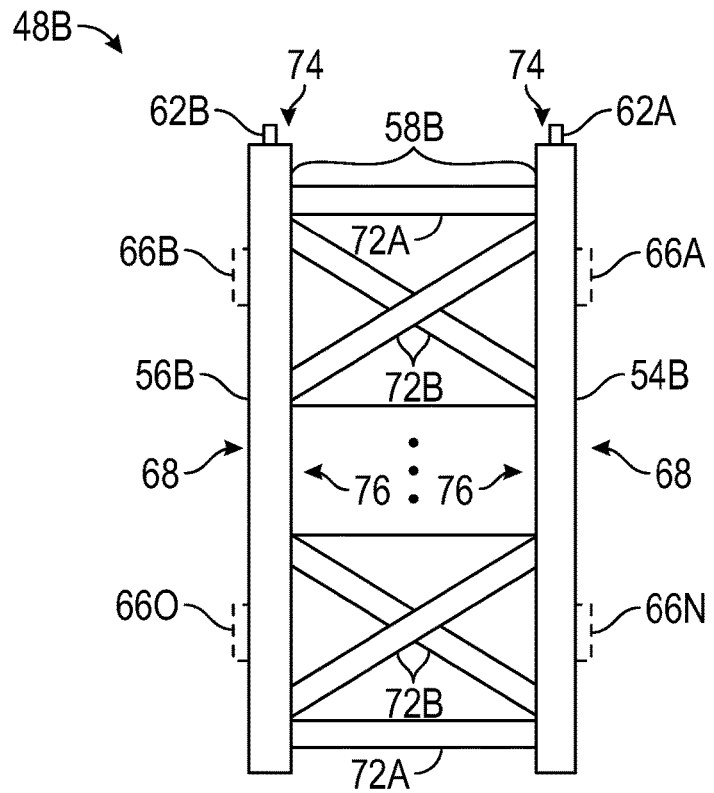
FIG. 6
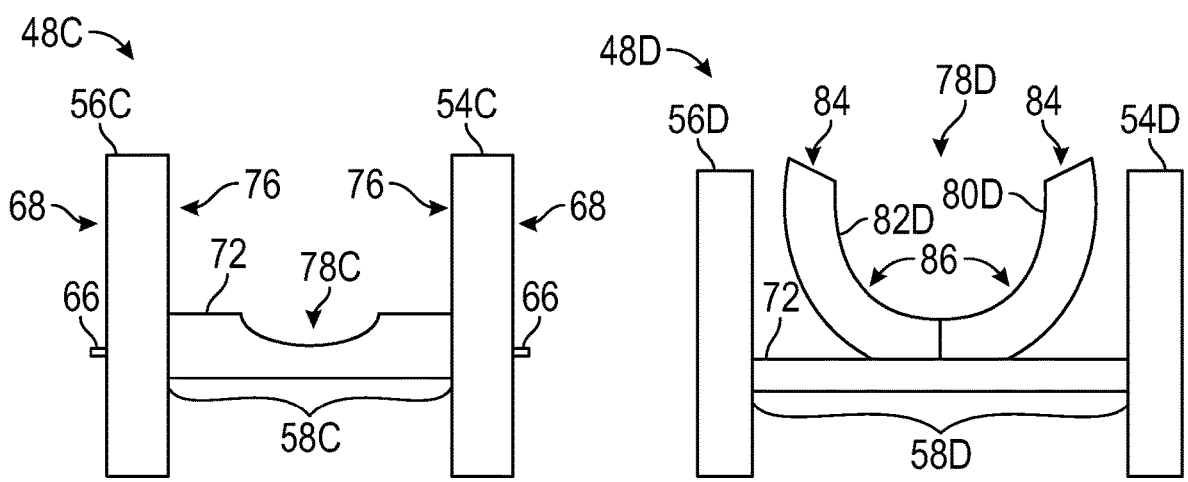
FIG. 7
FIG. 8

MID-PIPE PULLING DEVICE SYSTEMS AND METHODS

CROSS-REFERENCE

The present disclosure claims priority to and benefit of U.S. Provisional Patent Application No. 63/054,909, entitled "MID-PIPE PULLING DEVICE SYSTEMS AND METHODS" and filed Jul. 22, 2020, which is incorporated herein by reference in its entirety for all purposes.

BACKGROUND

The present disclosure generally relates to pipeline systems and, more particularly, to a pulling device that may be used to facilitate deploying (e.g., pulling and laying) one or more pipe segments in a pipeline system.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

Additionally, in some instances, a pipe segment to be deployed in a pipeline system may be flexible and, thus, spooled (e.g., coiled, wrapped, and/or wound) on a pipe drum before being deployed in the pipeline system. Furthermore, in some such instances, a pipe deployment system may be implemented and/or operated to deploy a pipe segment spooled on a pipe drum into a pipeline system, for example, at least in part by exerting pulling force on a free (e.g., unspooled) end of the pipe segment to unspool more of the pipe segment off of the pipe drum. However, at least in some instances, deploying a pipe segment from a pipe drum only by pulling on a free end of the pipe segment may potentially affect (e.g., reduce) deployment efficiency and/or operational efficiency of a pipeline system in which the pipe segment is deployed, for example, due to tensile force absorbed by the pipe segment increasing, and, thus, the pulling force that actually results at the pipe drum decreasing as distance between the free end of the pipe segment and the pipe drum increases.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipe deployment system includes pipe deployment equipment, in which a pipe drum having spooled thereon a pipe segment including tubing that defines a pipe bore and a fluid conduit within an annulus of the tubing is to be loaded on the pipe deployment equipment, and a pulling device to be secured to an unspooled section of the pipe segment to enable pulling equipment secured to the pulling device via a pulling cable to exert pulling force on the pipe segment. The pulling device includes a first device leg, a second device leg parallel to the first device leg, and a device base extending between and secured to a first inward-facing surface of the first device leg and a second inward-facing surface of the second device leg such that the device base is perpendicular to the first device leg and the second device leg and the device base is raised relative to a first bottom surface of the first device leg and a second bottom surface of the second device leg, in which the unspooled section of the pipe segment is to be disposed on the device base to facilitate securing the pulling device to the pipe segment.

In another embodiment, a method of implementing a pulling device in a pipe deployment system includes implementing a first device leg, in which the first device leg includes a first pad eye that enables a first cable branch of a pulling cable that is secured to pulling equipment in the pipe deployment system to be secured to the pulling device, implementing a second device leg, in which the second device leg includes a second pad eye that enables a second cable branch of the pulling cable that is secured to the pulling equipment in the pipe deployment system to be secured to the pulling device, and implementing a device base such that the device base extends between and is secured to a first inward-facing surface of the first device leg and a second inward-facing surface of the second device leg to enable a free section of a pipe segment that is to be pulled via the pulling device to be disposed on the device base.

In another embodiment, a pulling device in a pipe deployment system includes a first device leg, in which the first device leg includes a first plate and a first pad eye that enables a first cable branch of a pulling cable to be secured to the pulling device, a second device leg, in which the second device leg includes a second plate and a second pad eye that enables a second cable branch of the pulling cable to be secured to the pulling device, and a device base secured to the first plate of the first device leg and the second plate of the second device leg to enable a free section of a pipe segment to be pulled via the pulling device to be disposed on the device base, in which the device base includes a crossbeam that extends between and is secured to a first inward-facing surface of the first plate of the first device leg and a second inward-facing surface of the second plate of the second device leg.

BRIEF DESCRIPTION OF DRAWINGS

FIG. 6 is a top view of an example of the pulling device of FIG. 4 that includes a device base implemented using cross-beams, in accordance with an embodiment of the present disclosure.

FIG. 7 is a rear view of an example of the pulling device of FIG. 4 that includes a device base with a curved upper surface, in accordance with an embodiment of the present disclosure.

FIG. 8 is a rear view of another example of the pulling device of FIG. 4 that includes a device base with a curved upper surface, which is implemented using pipe grabbers, in accordance with an embodiment of the present disclosure.

DETAILED DESCRIPTION

Figure 1:
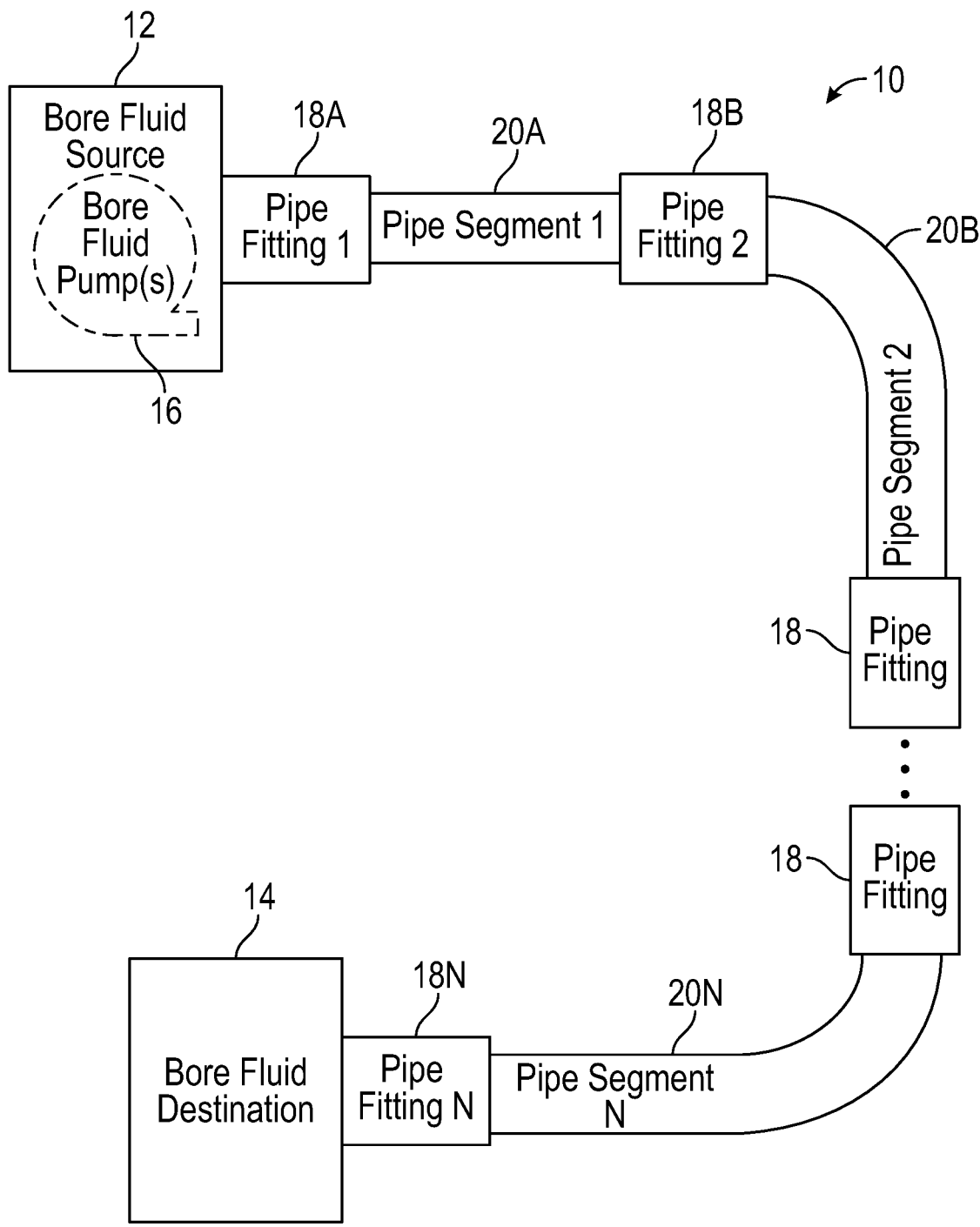
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

Furthermore, in some instances, a pipe segment may be flexible. In fact, in some such instances, the pipe segment may be spooled (e.g., coiled, wrapped, and/or wound) on a pipe drum, for example, which is implemented along with reel ends in a pipe reel or as an independent pipe drum. Moreover, in some such instances, a pipe deployment system may be implemented and/or operated to deploy (e.g., pull and lay) the pipe segment from the pipe drum into a pipeline system. In particular, in such instances, the pipe segment and the pipe drum may be loaded onto pipe deployment equipment, such as a pipe deployment trailer or a pipe deployment frame, in the pipe deployment system and, thus, the pipe deployment system may deploy the pipe segment in the pipeline system at least in part by operating to exert pulling force on a free (e.g., unspooled) section of the pipe segment that unspools (e.g., unwraps and/or unwinds) more of the pipe segment off of the pipe drum.

To facilitate exerting pulling force on a pipe segment, in addition to pipe deployment equipment, a pipe deployment system may include pulling equipment, such as a tow vehicle (e.g., truck), a bulldozer, an excavator, or the like. Additionally, the pipe deployment system may include a pulling device, which is implemented and/or operated to be secured to the pipe segment. In particular, in some instances, the pulling device may be secured to a free (e.g., unspooled) end of a pipe segment as well as being secured to the pulling equipment (e.g., via one or more pulling cables), thereby enabling the pipe deployment system to operate to exert pulling force at the free end of the pipe segment.

However, at least in some instances, unspooling a pipe segment for deployment in a pipeline system by pulling only on a free end of the pipe segment may potentially limit deployment efficiency of the pipeline system. In particular, at least in some instances, as the distance between a pulling device secured to the pipe segment and a corresponding pipe drum increases and/or the number of bends (e.g., curves) through which the pipe segment is pulled increases, the pulling force that actually results at the pipe drum may be substantially (e.g., significantly) less than the pulling force exerted at the pulling device and, thus, limit deployment speed of the pipe segment, for example, due at least in part to more of the pipe segment stretching to absorb tensile (e.g., pulling) force exerted thereon and/or a bend in the pipeline system absorbing a (e.g., orthogonal) component of the pulling force exerted on the pipe segment. Additionally or alternatively, since the amount of tensile force absorbed by the pipe segment increases as the distance between a pulling device secured thereto and a corresponding pipe drum increases, the likelihood of the tensile force inadvertently deforming the pipe segment and/or otherwise compromising the structural integrity of the pipe segment may also increase as the distance between pulling device and the pipe drum increases, thereby potentially limiting operational reliability of the pipeline system.

Accordingly, to facilitate improving pipeline deployment efficiency and/or pipeline operational reliability, the present disclosure provides techniques for implementing and/or operating a pipe deployment system with one or more pulling devices (e.g., sledges) that can be secured along a non-end portion (e.g., mid-pipe) of a pipe segment, for example, instead of solely at a free end of the pipe segment. As will be described in more detail below, a pulling device may generally include a first device leg, a second device leg, and a device base, which extends between and is secured to inward-facing surfaces of the first device leg and the second device leg. In particular, in some embodiments, the device legs of a pulling device may be implemented to be substantially parallel to one another while the device base of the pulling device may be implemented to be relatively perpendicular to the device legs. Additionally, in some embodiments, the device legs of a pulling device may each include a plate and/or the device base of the pulling device may be implemented using cross-beams.

In any case, a pulling device in a pipe deployment system may generally be implemented to have a free (e.g., unspooled) section of a pipe segment disposed on its device base. In other words, when a pipe segment is disposed in the pulling device, the first device leg and the second device leg may be on opposites sides of the pipe segment. Additionally, at least in some embodiments, a pulling device may be implemented such that the outer surface of a pipe segment to be pulled via the pulling device extends above the top surfaces of the device legs in the pulling device while disposed on the device base of the pulling device.

As such, to facilitate securing a pulling device to a pipe segment, in some embodiments, one or more pipe straps may be secured to the device legs of the pulling device and secured (e.g., tightened) around the outer surface of the pipe segment. To facilitate securing pipe straps to its device legs, the pulling device may include one or more strap handles (e.g., loops, hooks, and/or openings) implemented on the outward-facing surface of the device legs. For example, a first strap handle may be implemented on the outward-facing surface of the first device leg while a second strap handle is implemented on the outward-facing surface of the second device leg.

Thus, in such embodiments, the pulling device may be secured to a pipe segment at least in part by securing a pipe strap to a first strap handle on the first device leg of the pulling device, pulling the pipe strap over (e.g., on top of) the pipe segment, and securing the pipe strap to a second strap handle on the second device leg of the pulling device. Since the outer surface of the pipe segment extends above the top surfaces of the device legs while the pipe segment is disposed on the device base of the pulling device, tightening the pipe strap may cause the pipe strap to exert a downward force on the pipe segment that compresses the pipe segment between the pipe strap and the device base and, thus, facilitates securing the pulling device to the pipe segment. In fact, in some embodiments, a pulling device may include one or more rachet assemblies, which are each implemented and/or operated to enable selectively tightening and/or loosening a corresponding pipe strap.

In any case, since a pipe segment is generally implemented with a round (e.g., circular) outer surface, in some embodiments, the device base of a pulling device may be implemented with a curved (e.g., concave and/or semi-circular) upper surface, for example, to facilitate reducing the likelihood that the pulling device inadvertently deforms and/or otherwise comprises structural integrity of the pipe segment. In particular, in some such embodiments, the upper surface of the device base may be implemented with a curvature radius that matches or is slightly greater than the curvature radius of a pipe segment to be pulled via the pulling device. Accordingly, in such embodiments, the curved upper surface of the device base may facilitate increasing the contact area between the device base and the pipe segment and, thus, facilitate distributing the (e.g., reaction) force the device base exerts on the pipe segment over a larger area. Additionally, in some such embodiments, the curved upper surface of the device base in a pulling device may be directly implemented via the upper surface of one or more cross-beams in the device base.

However, in other embodiments, the curved upper surface of the device base in a pulling device may be implemented via pipe grabbers (e.g., clamps), for example, which are secured on top of one or more cross-beams in the device base. In particular, in some such embodiments, each pipe grabber in a pulling device may be a curved (e.g., semi-circular) pad. For example, the pipe grabbers of a pulling device may include a first curved pad and a second curved pad, which open toward one another.

Thus, in such embodiments, moving the pipe grabbers of a pulling device toward one another may facilitate engaging the inner surfaces of the pipe grabbers with the outer surface of a pipe segment disposed in the pulling device and, thus, securing the pulling device to the pipe segment. In particular, in some such embodiments, movement of the pipe grabbers may be manually controlled, for example, via external equipment, such as an excavator. Merely as an illustrative non-limiting example, an operator (e.g., user and/or service technician) may operate the external equipment to selectively move the pipe grabbers toward one another such that their inner surfaces engage the outer surface of a pipe segment and/or to selectively move the pipe grabbers away from one another, for example, such that their inner surfaces disengage from the outer surface of the pipe segment and/or to enable the pipe segment to be disposed in the pulling device.

However, to facilitate improving pipeline deployment efficiency, in other embodiments, a pulling device in a pipe deployment system may be implemented to autonomously control movement of its pipe grabbers. To facilitate autonomously controlling movement, in some embodiments, the device base of a pulling device may include one or more linkage assemblies that are implemented to secure its pipe grabbers to one or more of its cross-beams. In particular, a linkage assembly of a pulling device may include an upper (e.g., scissor) linkage arm pair—namely a first upper linkage arm, which is secured to a first pipe grabber of the pulling device at its upper end, and a second upper linkage arm, which is pivotably connected to the first upper linkage arm at an intersection point and secured to a second pipe grabber of the pulling device at its upper end. The linkage assembly may additionally include a lower linkage arm pair—namely a first lower linkage arm, which is pivotably connected to a cross-beam of the pulling device at its lower end and pivotably connected to the lower end of the first upper linkage arm at its upper end, and a second lower linkage arm, which is pivotably connected to the cross-beam at its lower end and pivotably connected to the lower end of the second upper linkage arm at its upper end.

Thus, in such embodiments, when a pipe segment is disposed on the device base (e.g., pipe grabbers) of the pulling device, the weight of the pipe segment may cause the lower linkage arm pair to pivot away from one another, which causes the lower ends of the upper (e.g., scissor) linkage arm pair to pivot away from one another and, thus, the pipe grabbers, which are secured to the upper ends of the upper linkage arm pair, to move toward one another. On the other hand, removing the weight of the pipe segment from the device base may enable the lower linkage arm pair to pivot toward one another, which causes the lower ends of the upper linkage arm pair to pivot toward one another and, thus, the pipe grabbers, which are secured to the upper ends of the upper linkage arm pair, to move away from one another. In this manner, a pulling device in a pipe deployment system may selectively secure itself to a pipe segment, for example, with little or no user intervention.

In any case, to facilitate reducing the likelihood of inadvertently over compressing a pipe segment, in some embodiments, a pulling device may be implemented to block movement of its pipe grabbers beyond a certain point. For example, in some such embodiments, the pipe grabbers of a pulling device may be implemented to block further compression once they directly abut one another. In other words, to facilitate pulling a pipe segment with a specific outer surface diameter while reducing the likelihood that a pulling device secured thereto inadvertently compromises the structural integrity of the pipe segment, in such embodiments, the pipe grabbers may be implemented such that the pipe grabber inner surface diameter that results when the pipe grabbers directly abut one another matches or is slightly smaller than a default (e.g., uncompressed and/or undeformed) outer surface diameter of the pipe segment.

Nevertheless, to facilitate further improving pipeline deployment efficiency, in some embodiments, a pulling device in a pipe deployment system may be implemented to be suitable for pulling pipe segments with different outer surface diameters. To facilitate accommodating multiple different pipe segment outer surface diameters, in some embodiments, a pulling device may include spacer bars with different lengths that are selectively secured between opposing ends of its pipe grabbers. In particular, in some such embodiments, different spacer bars may be associated with different pipe segment outer surface diameters.

For example, a longer spacer bar may block movement sooner and, thus, may be associated with a larger pipe segment outer surface diameter. On the other hand, a shorter spacer bar may block movement later and, thus, may be associated with a smaller pipe segment outer surface diameter. In other words, the longer spacer bar may be secured between opposing ends of the pipe grabbers when a pipe segment to be pulled via the pulling device has the larger pipe segment outer surface diameter while the shorter spacer bar may be secured between opposing ends of the pipe grabbers when the pipe segment to be pulled via the pulling device has the smaller pipe segment outer surface diameter.

In any case, to enable a pipe deployment system to exert pulling force on a pipe segment to which a pulling device is secured, the pulling device may be secured to pulling equipment in the pipe deployment system via one or more pulling cables. In particular, in some embodiments, a pulling cable may be secured to the device legs of the pulling device, for example, while an opposite end of the pulling cable is secured to the pulling equipment. Merely as an illustrative non-limiting example, a first cable branch of the pulling cable may be secured to a first pad eye on the first device leg of the pulling device and a second cable branch of the pulling cable, which is connected to the first cable branch, may be secured to a second pad eye on the second device leg of the pulling device.

To facilitate reducing the resistance a pulling device exerts against pulling force exerted thereon, in some embodiments, the pulling device may be implemented such that its device base is raised off of the ground and, thus, raised relative to bottom surfaces of its device legs. In other words, in some such embodiments, the pulling device may be implemented to have its device legs primarily contact the ground. In fact, to facilitate reducing the resistance a device leg exerts against pulling force exerted on a corresponding pulling device, the device leg may be implemented with a curved (e.g., rounded) forward-facing surface and/or a tapered bottom surface.

To facilitate further reducing the resistance a pulling device exerts against pulling force exerted thereon, in some embodiments, the pulling device may include device wheels rotatably secured to its device legs, thereby raising the device legs off of the ground. For example, the pulling device may include a first device wheel rotatably secured to its first device leg and a second device wheel rotatably coupled to its second device leg. In this manner, as will be described in more detail below, implementing and/or operating a pulling device in a pipe deployment system in accordance with the techniques described in the present disclosure may enable the pipe deployment system to exert pulling force on a pipe segment mid-pipe (e.g., not at free end), which, at least in some instances, may facilitate improving pipeline deployment efficiency and/or pipeline operational reliability, for example, at least in part by increasing the pulling force that actually results at a corresponding pipe drum and/or reducing the tensile (e.g., pulling) force absorbed by the pipe segment.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, a bore fluid pump 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., one or two) pipe segments 20 or more than three (e.g., four, five, or more) pipe segments 20. Additionally or alternatively, in other embodiments, a pipeline system 10 may include fewer than four (e.g., one, two, or three) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a pipe drum. In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing the flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
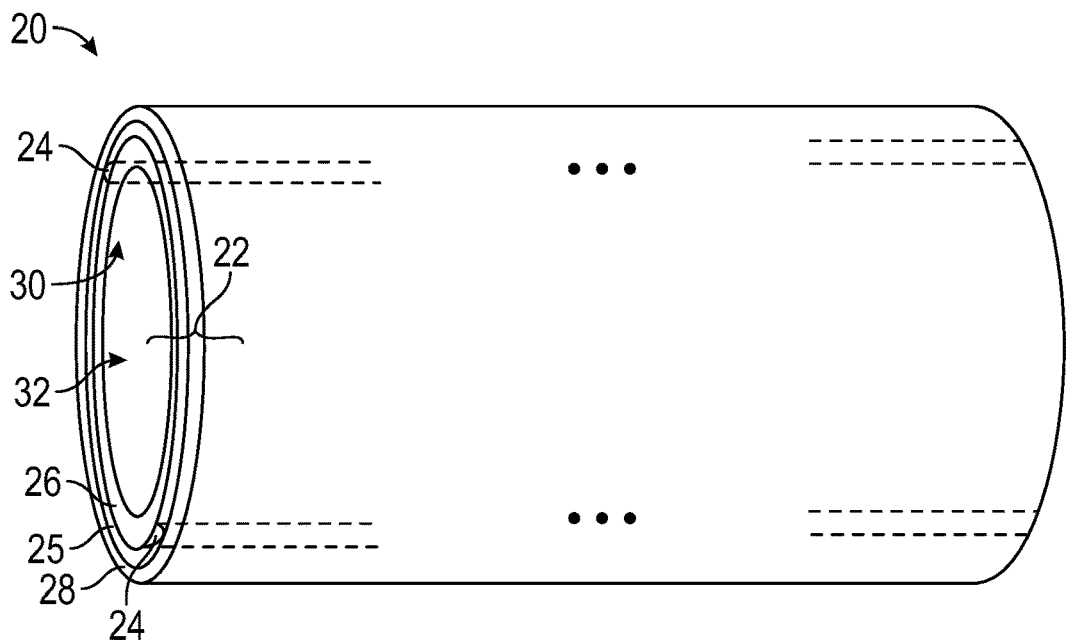
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in a tubing annulus 25, is shown in FIG. 2. As depicted, the pipe segment tubing 22 is implemented with multiple layers including an inner barrier (e.g., liner and/or sheath) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or any combination thereof. Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more intermediate layers of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, as compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer than two (e.g., one) or more than two (e.g., three, four, or more) fluid conduits 24 defined in its tubing annulus 25. Additionally or alternatively, in other embodiments, a fluid conduit 24 defined in a tubing annulus 25 of a pipe segment 20 may run non-parallel to the pipe bore 32 of the pipe segment 20, for example, such that the fluid conduit 24 is skewed relative to the longitudinal axis of the pipe bore 32.

Figure 3:
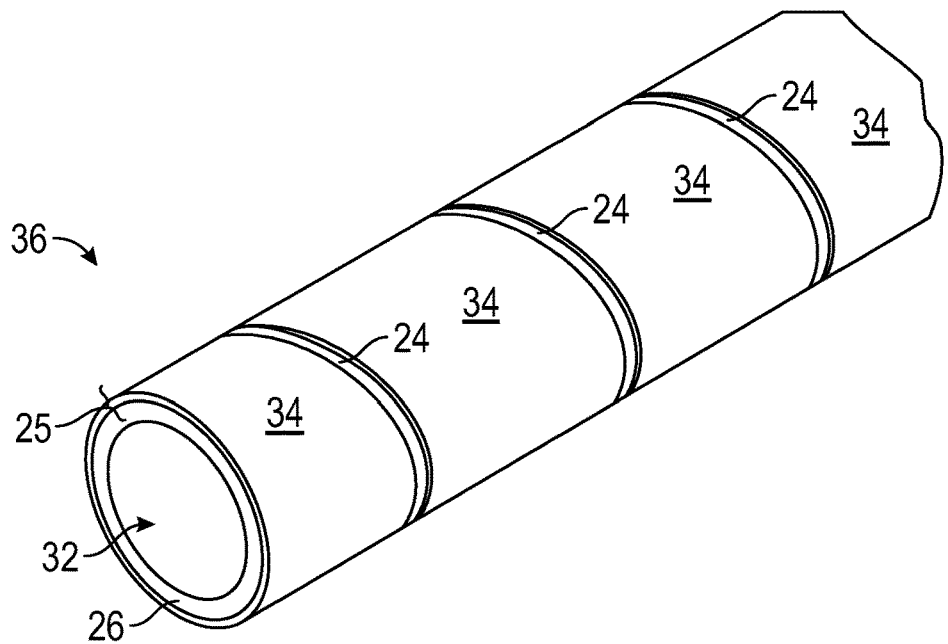
FIG. 3 is an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner barrier layer 26 and an intermediate layer 34 included in a tubing annulus 25 of its pipe segment tubing 22, is shown in FIG. 3. In some embodiments, one or more intermediate layers 34 of the pipe segment tubing 22 may be implemented using a solid material that has a higher tensile strength and/or a higher hoop strength as compared to a solid material used to implement the inner barrier layer 26. For example, the inner barrier layer 26 may be implemented using plastic, such as high-density polyethylene (HDPE), while an intermediate layer 34 is implemented using composite material and/or metal, such as carbon steel, stainless steel, duplex stainless steel, super duplex stainless steel, or any combination thereof. In other words, at least in some such embodiments, an intermediate layer 34 of the pipe segment tubing 22 may be implemented using electrically conductive, which, at least in some instances, may enable communication of electrical (e.g., test and/or return) signals via the intermediate layer 34.

In any case, as depicted, the intermediate layer 34 is helically disposed (e.g., wound and/or wrapped) on the inner barrier layer 26 such that gaps (e.g., openings) are left between adjacent windings to define a fluid conduit 24. In other words, in some embodiments, the intermediate layer 34 may be implemented at least in part by winding a solid strip of material around the inner barrier layer 26 at a non-zero lay angle (e.g., fifty-four degrees) relative to the longitudinal axis of the pipe bore 32. In any case, as depicted, the resulting fluid conduit 24 runs helically along the pipe segment 20, for example, such that the fluid conduit 24 is skewed fifty-four degrees relative to the longitudinal axis of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34. In any case, as described above, in some instances, one or more pipe segments 20 may be deployed in a pipeline system 10 via a pipe deployment system.

Figure 4:
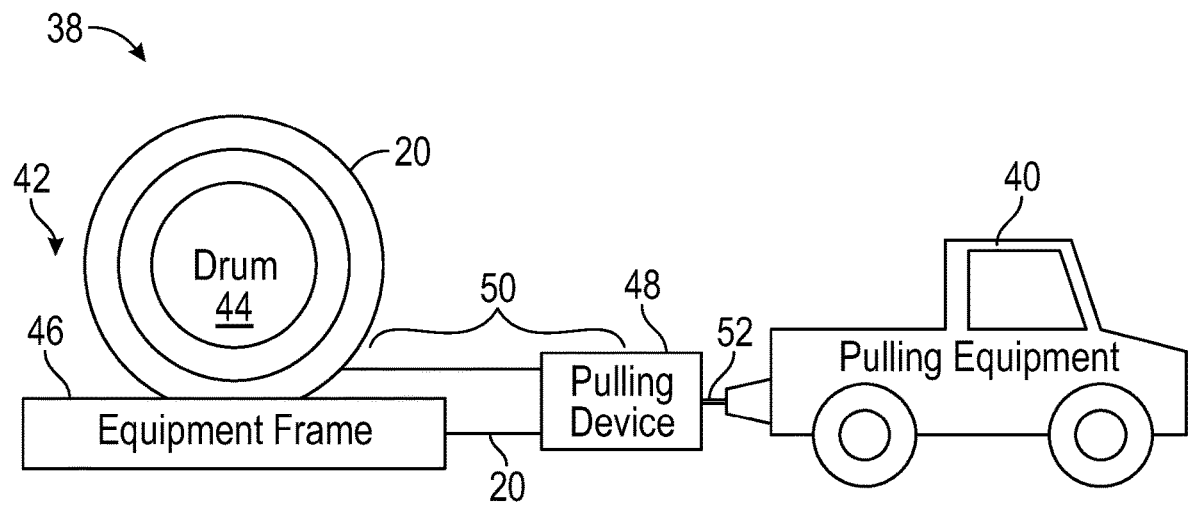
FIG. 4 is a side view of an example of a pipe deployment system that includes a pulling device and pipe deployment equipment, which is loaded with a pipe segment that is spooled on a pipe drum and secured to the pulling device, in accordance with an embodiment of the present disclosure.

To help illustrate, an example of a pipe deployment system 38 is shown in FIG. 4. As depicted, the pipe deployment system 38 includes pulling equipment 40 and pipe deployment equipment 42. In some embodiments, the pipe deployment equipment may be a pipe deployment trailer or a pipe deployment frame while the pulling equipment 40 may be a tow vehicle (e.g., truck), a bulldozer, an excavator, or the like.

Additionally, as depicted, a pipe drum 44 and a pipe segment 20 spooled (e.g., wrapped and/or wound) thereon are loaded on an equipment frame 46 of the pipe deployment equipment 42. In some embodiments, the pipe drum 44 may be an independent pipe drum 44. However, in other embodiments, the pipe drum 44 may be included in a pipe reel that has reel ends implemented on either side of the pipe drum 44.

In any case, as depicted, the pipe deployment system 38 additionally includes a pulling device (e.g., sledge) 48. In particular, as depicted, the pulling device 48 is secured to a free (e.g., unspooled) section 50 of the pipe segment 20 as well as being secured to the pulling equipment 40 via one or more pulling cables 52. For example, in some instances, the pulling device 48 may be secured to a free end of the pipe segment 20, thereby enabling the pulling equipment 40 to exert pulling force on the pulling device 48 and, thus, the pipe segment 20 that facilitates unspooling more of the pipe segment 20 off of the pipe drum 44.

However, at least in some instances, unspooling a pipe segment 20 for deployment in a pipeline system 10 by pulling solely on a free end of the pipe segment 20 may potentially limit deployment efficiency and/or operational reliability of the pipeline system 10. In particular, at least in some instances, as the distance between the pulling device 48 and the pipe drum 44 increases and/or the number of bends (e.g., curves) through which the pipe segment 20 is pulled increases, the pulling force that actually results at the pipe drum 44 may be substantially (e.g., significantly) less than the pulling force exerted at the pulling device 48, thereby limiting deployment speed of the pipe segment 20, for example, due at least in part to more of the pipe segment 20 stretching to absorb tensile (e.g., pulling) force exerted thereon and/or a bend in the pipeline system 10 absorbing a (e.g., orthogonal) component of the pulling force exerted on the pipe segment 20. Additionally or alternatively, since the amount of tensile force absorbed by the pipe segment 20 increases as the distance between the pulling device 48 and the pipe drum 44 increases, the likelihood of the tensile force inadvertently deforming the pipe segment 20 and/or otherwise compromising the structural integrity of the pipe segment 20 may also increase as the distance between pulling device 48 and the pipe drum 44 increases, thereby potentially limiting operational reliability of the pipeline system 10.

Accordingly, to facilitate improving pipeline deployment efficiency and/or pipeline operational reliability, the present disclosure provides techniques for implementing and/or operating a pipe deployment system 38 with one or more pulling devices 48 that can be secured along a non-end portion of the free section 50 of the pipe segment 20. In other words, as will be described in more detail below, the present disclosure describes techniques for implementing and/or operating a pulling device 48 that can be secured to a pipe segment 20 mid-pipe. Nevertheless, it should be appreciated that, in some embodiments, a mid-pipe pulling device 48 may be secured to a free end of a pipe segment 20 as well as a non-end portion of the pipe segment 20, for example, at different times.

Figure 5:
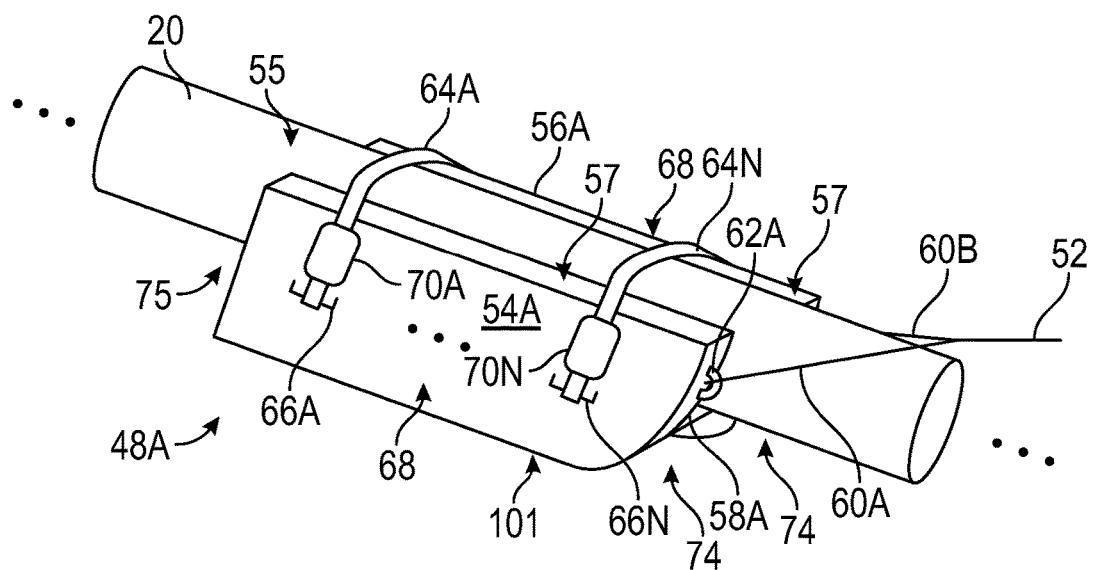
FIG. 5 is a perspective view of an example of the pulling device of FIG. 4, in accordance with an embodiment of the present disclosure.

To help illustrate, an example of a (e.g., mid-pipe) pulling device 48A, which may be included in a pipe deployment system 38, is shown in FIG. 5. As depicted, the pulling device 48A includes a first device leg 54A, a second device leg 56A, and a device base 58A. In particular, as in the depicted example, in some embodiments, the first device leg 54 and the second device leg 56 of a pulling device 48 may each include a plate that is implemented to be substantially parallel to the plate of the other device leg.

Additionally, although partially obfuscated from view, the device base 58A of the pulling device 48A extends between and is secured to inward-facing surfaces of the first device leg 54A and the second device leg 56A. In particular, as in the depicted example, in some embodiments, the device base 58 of a pulling device 48 may be implemented to be substantially perpendicular (e.g., orthogonal) to the first device leg 54 and the second device leg 56 of the pulling device 48. Furthermore, as will be described in more detail below, in some embodiments, the device base 58 of a pulling device 48 may be implemented with one or more plates and/or one or more cross-beams.

Moreover, as depicted, to enable pulling force to be exerted on the pulling device 48A, a pulling cable 52 is secured to the pulling device 48A, for example, while an opposite end of the pulling cable 52 is secured to pulling equipment 40, such as a tow vehicle, an excavator, a bulldozer, or the like. In particular, in the depicted example, a first cable branch 60A of the pulling cable 52 is secured to the first device leg 54A via a first pad eye 62A on the forward-facing surface 74 of the first device leg 54A. Although obfuscated from view, a second cable branch 60B of the pulling cable 52 is similarly secured to the second device leg 56B via a second pad eye 62 on the forward-facing surface 74 of the second device leg 56A. However, in other embodiments, a pulling cable 52 may additionally or alternatively be secured to the device base 58 of a pulling device 48, for example, via one or more pad eyes 62 on the device base 58.

In any case, as depicted, when a pipe segment 20 is disposed in the pulling device 48A, the first device leg 54A and the second device leg 56A are on opposite sides of the pipe segment 20. Additionally, as in the depicted example, in some embodiments, when a pipe segment 20 is disposed in a pulling device 48, the outer surface 55 of the pipe segment 20 may extend above the top surfaces 57 of the device legs in the pulling device 48. Thus, as in the depicted example, in such embodiments, the pulling device 48 may be secured to a pipe segment 20 via one or more pipe straps 64 that are secured to its device legs and secured (e.g., tightened) around the pipe segment 20.

To facilitate securing one or more pipe straps 64 to its device legs, in the depicted example, the pulling device 48A includes strap handles 66 implemented on the outward-facing surfaces 68 of its device legs. In particular, a first set of strap handles 66 that includes a first strap handle 66A and an Nth strap handle 66N is implemented on the outward-facing surface 68 of the first device leg 54A. Although obfuscated from view, a second set of strap handles 66 (e.g., a second strap handle 66 and/or an N+1th strap handle 66) is similarly implemented on the outward-facing surface 68 of the second device leg 56A.

As such, tightening a pipe strap 64 of a pulling device 48 that is secured around a pipe segment 20 may compress the pipe segment 20 between the pipe strap 64 and the device base 58 of the pulling device 48 and, thus, facilitate securing the pulling device 48 to the pipe segment 20, for example, mid-pipe. In fact, as in the depicted example, to facilitate selectively securing a pulling device 48 to a pipe segment 20, in some embodiments, the pulling device 48 may include one or more rachet assemblies 70, for example, which are each used to selectively tighten and/or loosen a corresponding pipe strap 64. In particular, in the depicted example, the pulling device 48A includes a first rachet assembly 70A, which may be used to selectively tighten and/or loosen a first pipe strap 64A, and an Nth rachet assembly 70N, which may be used to selectively tighten and/or loosen an Nth pipe strap 64N.

In any case, to facilitate securing a pulling device 48 to a pipe segment 20, in some embodiments, the upper surface of its device base 58 may be implemented with a friction promoting material, such as rubber, and/or contoured, for example, with teeth and/or serrations. Additionally or alternatively, as will be described in more detail below, the device base 58 of a pulling device 48 may be implemented with a curved (e.g., concave and/or semi-circular) upper surface. Furthermore, as mentioned above, in some embodiments, the device base 58 of a pulling device 48 may be implemented using one or more plates. However, to facilitate reducing weight, the device base 58 of a pulling device 48 may additionally or alternatively be implemented using one or more cross-beams.

To help illustrate, an example of a pulling device 48B, which includes a device base 58B implemented using cross-beams 72, is shown in FIG. 6. In addition to the device base 58B, similar to FIG. 5, as depicted in FIG. 6, the pulling device 48B includes a first device leg 54B that has a first pad eye 62A implemented on its forward-facing surface 74 and a first set of strap handles 66, which includes a first strap handle 66A and an Nth strap handle 66N, that is implemented on its outward-facing surface 68. Additionally, as depicted, the pulling device 48B includes a second device leg 56B that has a second pad eye 62B implemented on its forward-facing surface 74 and a second set of strap handles 66, which includes a second strap handle 66B and an N+1th strap handle 66O, that is implemented on its outward-facing surface 68. In fact, in some embodiments, the first device leg 54B of the pulling device 48B in FIG. 6 may generally match the first device leg 54A of the pulling device 48A in FIG. 5 and/or the second device leg 56B of the pulling device 48B in FIG. 6 may generally match the second device leg 56A of the pulling device 48A in FIG. 5.

In any case, as depicted in FIG. 6, the device base 58B of the pulling device 48B includes cross-beams 72 that extend between and are secured to inward-facing surfaces 76 of the first device leg 54B and the second device leg 56B. In particular, as in the depicted example, in some embodiments, the device base 58 of a pulling device 48 may include one or more perpendicular (e.g., orthogonal) cross-beams 72A, which are each implemented substantially (e.g., relatively) perpendicular to the device legs of the pulling device 48. Additionally or alternatively, as in the depicted example, the device base 58 of a pulling device 48 may include one or more slanted (e.g., angled) cross-beams 72B, which are each implemented to be slanted relative to the device legs of the pulling device 48.

However, it should be appreciated that the depicted example is merely intended to be illustrative and not limiting. In particular, in other embodiments, the device base 58 of a pulling device 48 may be implemented with a different cross-beam configuration, for example, which includes more than two (e.g., three, four, or more) perpendicular cross-beams 72A, fewer than two (e.g., zero or one) perpendicular cross-beams 72A, more than two (e.g., three, four, or more) pairs of slanted cross-beams 72B, fewer than two (e.g., zero or one) pairs of slanted cross-beams 72B, or any combination thereof. Additionally or alternatively, as will be described in more detail below, a pulling device 48 may be implemented without strap handles 66. Furthermore, as mentioned above in some embodiments, the device base 58 of a pulling device 48 may be implemented with a curved (e.g., concave and/or semi-circular) upper surface.

To help illustrate, an example of a pulling device 48C, which includes a device base 58C with a curved upper surface 78C, is shown in FIG. 7. In addition to the device base 58C, similar to FIG. 5, as depicted in FIG. 7, the pulling device 48C additionally includes a first device leg 54C, which has a first set of strap handles 66 implemented on its outward-facing surface 68, and a second device leg 56C, which has a second set of strap handles 66 implemented on its outward-facing surface 68. In fact, in some embodiments, the first device leg 54C of the pulling device 48C in FIG. 7 may generally match the first device leg 54A of the pulling device 48A in FIG. 5 and/or the second device leg 56C of the pulling device 48C in FIG. 7 may generally match the second device leg 56A of the pulling device 48A in FIG. 5.

In any case, since a pipe segment 20 is generally implemented with a round (e.g., circular) outer surface 55, implementing the device base 58 of a pulling device 48 with a curved upper surface 78 may facilitate increasing the contact area between the device base 58 and the pipe segment 20. In other words, the curved upper surface 78 of the device base 58 may facilitate distributing force (e.g., reaction force) exerted on the pipe segment 20 by the device base 58 over a larger area, which, at least in some instances, may facilitate reducing the likelihood that the pulling device 48 inadvertently deforms and/or otherwise compromises structural integrity of the pipe segment 20. In particular, to facilitate distributing the force exerted on the pipe segment 20 over a larger area, the curved upper surface 78 of the device base 58 may be implemented with a curvature radius that matches or is slightly larger than a default (e.g., uncompressed and/or undeformed) curvature radius of the pipe segment 20.

Additionally, as in the depicted example, in some embodiments, the curved upper surface 78 of a device base 58 may be implemented directly via the upper surfaces of one or more cross-beams 72 in the device base 58. In other words, in such embodiments, the device base 58 may include one or more perpendicular cross-beams 72A, which each has a curved upper surface 78. In such embodiments, the device base 58 may additionally or alternatively include one or more slanted cross-beams 72B, which each has a curved upper surface 78.

However, it should be appreciated that the depicted example is merely intended to be illustrative and not limiting. In particular, in other embodiment, the curved upper surface 78 of a device base 58 may be implemented directly via the upper surface of one or more plates in the device base 58. Additionally, in other embodiments, the curved upper surface 78 of a device base 58 may be implemented using pipe grabbers secured on top of one or more cross-beams 72 and/or one or more plates in the device base 58, for example, instead of using the cross-beams 72 and/or the plates themselves. Furthermore, in other embodiments, device legs of a pulling device 48 may not include strap handles 66, for example, when the curved upper surface 78 of a corresponding device base 58 is implemented using pipe grabbers.

To help illustrate, another example of a pulling device 48D, which has a device base 58D with a curved upper surface 78D that is implemented via pipe grabbers (e.g., clamps)—namely a first pipe grabber 80D and a second pipe grabber 82D, is shown in FIG. 8. In addition to the device base 58D, similar to FIG. 7, as depicted in FIG. 8, the pulling device 48D includes a first device leg 54D and a second device leg 56D. Additionally, similar to FIG. 7, as depicted in FIG. 8, the device base 58D of the pulling device 48D include one or more cross-beams 72.

However, as depicted in FIG. 8, the curved upper surface 78D of the device base 58D is implemented using pipe grabbers—namely a first pipe grabber 80D and a second pipe grabber 82D—that are secured on top of one or more cross-beams 72 of the device base 58D. In particular, as in the depicted example, in some embodiments, the pipe grabbers of a pulling device 48 may each be a curved (e.g., semi-circular) pad that opens toward the pad of the other (e.g., opposing) pipe grabber. Accordingly, to facilitate securing the pulling device 48 to a pipe segment 20, in such embodiments, after the pipe segment 20 is disposed in the pulling device 48, opposing ends 84 of the pipe grabbers may be moved toward one another such that inner surfaces 86 of the pipe grabbers engage the outer surface 55 of the pipe segment 20.

In particular, in some embodiments, movement of the first pipe grabber 80D and the second pipe grabber 82D and, thus, securement of the pulling device 48D to a pipe segment 20 may be manually controlled, for example, via external equipment, such as an excavator. Merely as an illustrative non-limiting example, an operator (e.g., user and/or service technician) may operate the external equipment to selectively move the pipe grabbers toward one another such that their inner surfaces 86 engage the outer surface of the pipe segment 20 and/or to selectively move the pipe grabbers away from one another, for example, such that their inner surfaces disengage from the outer surface of the pipe segment 20 and/or to enable the pipe segment 20 to be disposed in the pulling device 48D. In fact, as in the depicted example, since used to secure a corresponding pulling device 48 to a pipe segment 20, in some embodiments, the pipe grabbers of the pulling device may obviate inclusion of pipe straps 64 and, thus, corresponding strap handles 66 and corresponding rachet assemblies 70 in the pulling device 48.

However, it should be appreciated that the depicted example is merely intended to be illustrative to be illustrative and not limiting. In particular, in other embodiments, the pulling device 48D may nevertheless include one or more pipe straps 64 and, thus, corresponding strap handles 66 and corresponding rachet assemblies 70, for example, to facilitate improving securement strength. Furthermore, in other embodiments, the first pipe grabber 80 and the second pipe grabber 82 of a pulling device 48 may additionally or alternatively be secured on top of one or more plates in the device base 58 of the pulling device 48. Moreover, in other embodiments, the pipe grabbers of a pulling device 48 may be secured to a cross-beam 72 and/or a plate of a corresponding device base 58 via one or more linkage assemblies, for example, instead of being secured directly thereto.

Figure 9:
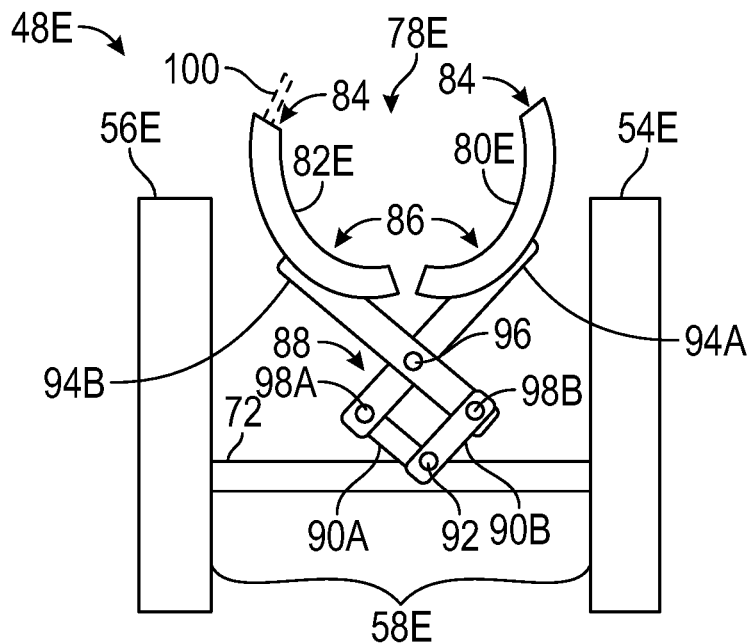
FIG. 9 is a rear view of another example of the pulling device of FIG. 4 with a device base that includes pipe grabbers secured to a cross-beam via a linkage assembly, in accordance with an embodiment of the present disclosure.

To help illustrate, another example of a pulling device 48E, which includes a device base 58E with pipe grabbers—namely a first pipe grabber 80E and a second pipe grabber 82E—that are secured via a linkage assembly 88 to implement a curved upper surface 78E, is shown in FIG. 9. In addition to the device base 58D, similar to FIG. 7, as depicted in FIG. 9, the pulling device 48E includes a first device leg 54E and a second device leg 56E. Additionally, similar to FIG. 7, as depicted in FIG. 9, the device base 58E of the pulling device 48E include one or more cross-beams 72.

However, as depicted in FIG. 9, the pipe grabbers of the pulling device 48E are secured to a cross-beam 72 of the device base 58E via a linkage assembly 88, for example, instead of being secured directly thereto. In particular, as in the depicted example, a linkage assembly 88 of a pulling device 48 may include a lower linkage arm pair—namely a first lower linkage arm 90A and a second lower linkage arm 90B—that are pivotably connected to the cross-beam 72 via a lower pivotable fastener 92, such as a nut and bolt pair. Additionally, the linkage assembly 88 may include an upper (e.g., scissor) linkage arm pair—namely a first upper linkage arm 94A and a second upper linkage arm 94B—that are pivotably connected at an intersection point via an upper pivotable fastener 96, such as a nut and bolt pair. Furthermore, as in the depicted example, the lower end of the first upper linkage arm 94A may be pivotably connected to the first lower linkage arm 90A via a first side pivotable fastener 98A, such as a nut and bolt pair, while the upper end of the first upper linkage arm 94A may be secured to the first pipe grabber 80E. Similarly, the lower end of the second upper linkage arm 94B may be secured to the second lower linkage arm 90B via a second side pivotable fastener 98B, such as a nut and bolt pair, while the upper end of the second upper linkage arm 94B may be secured to the second pipe grabber 82E.

As such, when a pipe segment 20 is disposed on the device base 58E (e.g., pipe grabbers), the weight of the pipe segment 20 may cause the lower linkage arms 90 to pivot away from one another, which causes the lower ends of the upper linkage arm 94 to pivot away from one another and, thus, the pipe grabbers, which are secured to upper ends of the upper linkage arms 94, to move toward one another. On the other hand, removing the weight of the pipe segment 20 from the device base 58E may enable the lower linkage arms 90 to pivot toward one another, which causes the lower ends of the upper linkage arms 94 to pivot toward one another and, thus, the pipe grabbers, which are secured to the upper ends of the upper linkage arms 94, to move away from one another. In this manner, a linkage assembly 88 in a pulling device 48 may enable the pulling device to autonomously secure itself to a pipe segment 20, which, at least in some instances, may facilitate improving pipeline deployment efficiency, for example, by enabling a reduction in user intervention.

However, in some instances, the weight of a pipe segment 20 disposed in a pulling device 48 may cause its pipe grabbers to continue moving toward one another until they directly abut one another. Thus, to facilitate reducing the likelihood of inadvertently over compressing a pipe segment, in some embodiments, the pipe grabbers of a pulling device 48 may be implemented such that the pipe grabber inner surface diameter that results when they directly abut one another matches or is slightly smaller than a default (e.g., uncompressed and/or undeformed) outer surface diameter of a pipe segment 20 to be pulled via the pulling device 48. To facilitate improving pipeline deployment efficiency, in some embodiments, a pulling device 48 may nevertheless be implemented to be suitable for pulling pipe segments 20 with different outer surface diameters.

In particular, as in the depicted example, to facilitate accommodating multiple different pipe segment outer surface diameters, in some embodiments, a pulling device 48 may include one or more spacer bars 100, which are to be selectively secured in a spacer bar opening implemented on the opposing ends 84 of the pipe grabbers. In particular, in some such embodiments, different spacer bars 100 may be implemented with different lengths. In fact, in some such embodiments, different spacer bars 100 may be associated with different pipe segment outer surface diameters. For example, a first spacer bar 100 may be associated with a first pipe segment outer surface diameter while a second spacer bar 100, which is shorter than the first spacer bar 100, may be associated with a second pipe segment outer surface diameter, which is smaller than the first pipe segment outer surface diameter.

Thus, in such embodiments, a spacer bar 100 of a pulling device 48 may be selectively secured between the opposing ends 84 of the pipe grabbers in the pulling device 48 based on the outer surface diameter of a pipe segment 20 to be pulled via the pulling device 48. For example, the first spacer bar may be secured between the pipe grabbers when the pipe segment 20 has the first pipe segment outer surface diameter while the second spacer bar may be secured between the pipe grabbers when the pipe segment 20 has the second pipe segment outer surface diameter. In some such embodiments, no spacer bar 100 may be secured between pipe grabbers when the pipe segment 20 has a third pipe segment outer surface diameter, which is smaller than the first pipe segment outer surface diameter and the second pipe segment outer surface diameter. In this manner, a pulling device 48 in a pipe deployment system 38 may be implemented to be suitable for pulling multiple different pipe segment outer surface diameters mid-pipe, which, at least in some instances, may facilitate improving pipeline deployment efficiency, for example, at least in part by reducing the number of different pulling devices 48 used to deploy a pipeline system 10 that will include pipe segments 20 with different outer surface diameters.

However, it should be appreciated that the depicted example is merely intended to be illustrative and not limiting. In particular, in other embodiments, the pulling device 48E may nevertheless include one or more pipe straps 64 and, thus, corresponding strap handles 66 and corresponding rachet assemblies 70, for example, to facilitate improving securement strength. Additionally, in other embodiments, the device base 58 of a pulling device 48 may include a linkage assembly 88 that secures the pipe grabbers of the pulling device 48 to one or more plates in the device base 58. Furthermore, in some embodiments, the device base 58 of a pulling device 48 may include multiple linkage assemblies 88 that secure the pipe grabbers of the pulling device 48 to cross-beams 72 and/or a plate of the device base 58.

In any case, as in the examples depicted in FIGS. 7-9, in some embodiments, a pulling device 48 in a pipe deployment system 38 may be implemented such that its device base 58 is raised off of the ground and, thus, raised relative to the bottom surfaces 101 of its device legs. In other words, in some such embodiments, the pulling device 48 may be implemented to have its device legs primarily contact the ground. Thus, to facilitate reducing the resistance its device legs exert against pulling force that is exerted thereon, as in the example depicted in FIG. 5, in some embodiments, the device legs of a pulling device 48 may each be implemented with a curved (e.g., rounded) forward-facing surface 74. In some embodiments, a device leg of a pulling device 48 may additionally or alternatively be implemented with a bottom surface 101 that is tapered, for example, in the form of a blade and/or a wedge.

However, it should again be appreciated that the depicted example is merely intended to be illustrative and not limiting. In particular, in other embodiments, the device legs of a pulling device 48 may be implemented with a curved (e.g., rounded) rear-facing surface 75 and/or a squared forward facing surface 74. Additionally or alternatively, to facilitate further reducing the resistance a pulling device 48 exerts against pulling force that is exerted thereon, the pulling device 48 may be implemented such that its device legs are also raised off of the ground.

Figure 10:
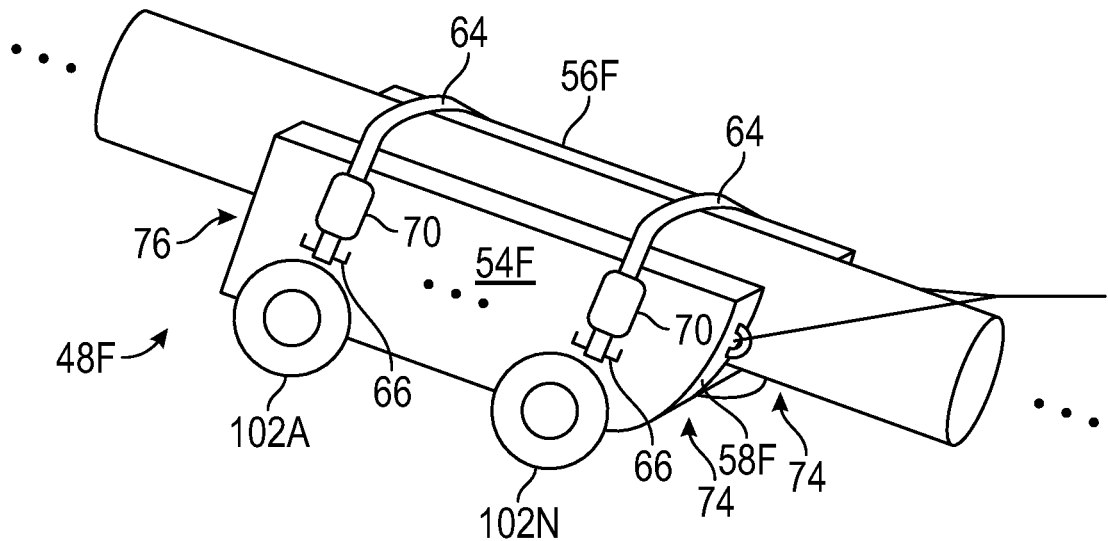
FIG. 10 is a perspective view of another example of the pulling device of FIG. 4 that includes device wheels, in accordance with an embodiment of the present disclosure.

To help illustrate, another example of a pulling device 48F, which has its device legs raised off of the ground, is shown in FIG. 10. In particular, similar to FIG. 5, as depicted in FIG. 10, the pulling device 48F includes a first device leg 54F and a second device leg 56F. Additionally, similar to FIG. 5, as depicted in FIG. 10, the pulling device 48F includes a device base 58F. In fact, in some embodiments, the device base 58F of the pulling device in FIG. 10 may generally match the device base 58A of the pulling device 48A in FIG. 10 and/or the device legs of the pulling device 48F in FIG. 10 may generally match the device legs of the pulling device 48A in FIG. 5.

However, as depicted in FIG. 10, the pulling device 48F additionally includes device wheels 102 rotatably secured to its device legs. In particular, as depicted, a first set of device wheels 102, which includes a first device wheel 102A and an Nth device wheel 102N, is rotatably secured to the first device leg 54F of the pulling device 48F. Although obfuscated from view, a second set of device wheels 102 (e.g., a second device wheel 102 and an N+1th device wheel 102) is rotatably secured to the second device leg 56F of the pulling device 48F opposite the first set of device wheels 102. In this manner, as in the depicted example, device wheels 102 of a pulling device 48 may facilitate raising the device legs of the pulling device 48 off of the ground, which, at least in some instances, may facilitate further improving pipeline deployment efficiency, for example, at least in part by further reducing the resistance the pulling device 48 exerts against pulling force exerted thereon to pull (e.g., unspool) a pipe segment 20.

Nevertheless, it should be appreciated that the depicted example is merely intended to be illustrative and not limiting. In particular, in other embodiments, the pulling device 48F may additionally or alternatively include pipe grabbers, for example, in addition to one or more corresponding linkage assemblies 88. In other words, in some such embodiments, the pulling device 48F may not include the pipe straps 64, the strap handles 66, and/or the rachet assemblies 70. Additionally, in other embodiments, a pulling device 48 may include fewer than two (e.g., one) or more than two (e.g., three, four, or more) device wheels 102 secured to each of its device legs. Furthermore, in other embodiments, one or more device wheels 102 of a pulling device 48 may be include in a track assembly. In any case, in this manner, a pulling device 48 of a pipe deployment system 38 may be implemented to enable the pipe deployment system 38 to exert pulling force mid-pipe (e.g., not at end) on a pipe segment 20 to be deployed in a pipeline system 10, which, at least in some instances, may facilitate improving pipeline deployment efficiency and/or pipeline operational reliability, for example, at least in part by increasing the pulling force that actually results at a corresponding pipe drum 44 and/or reducing the tensile (e.g., pulling) force absorbed by the pipe segment 20.

Figure 11:
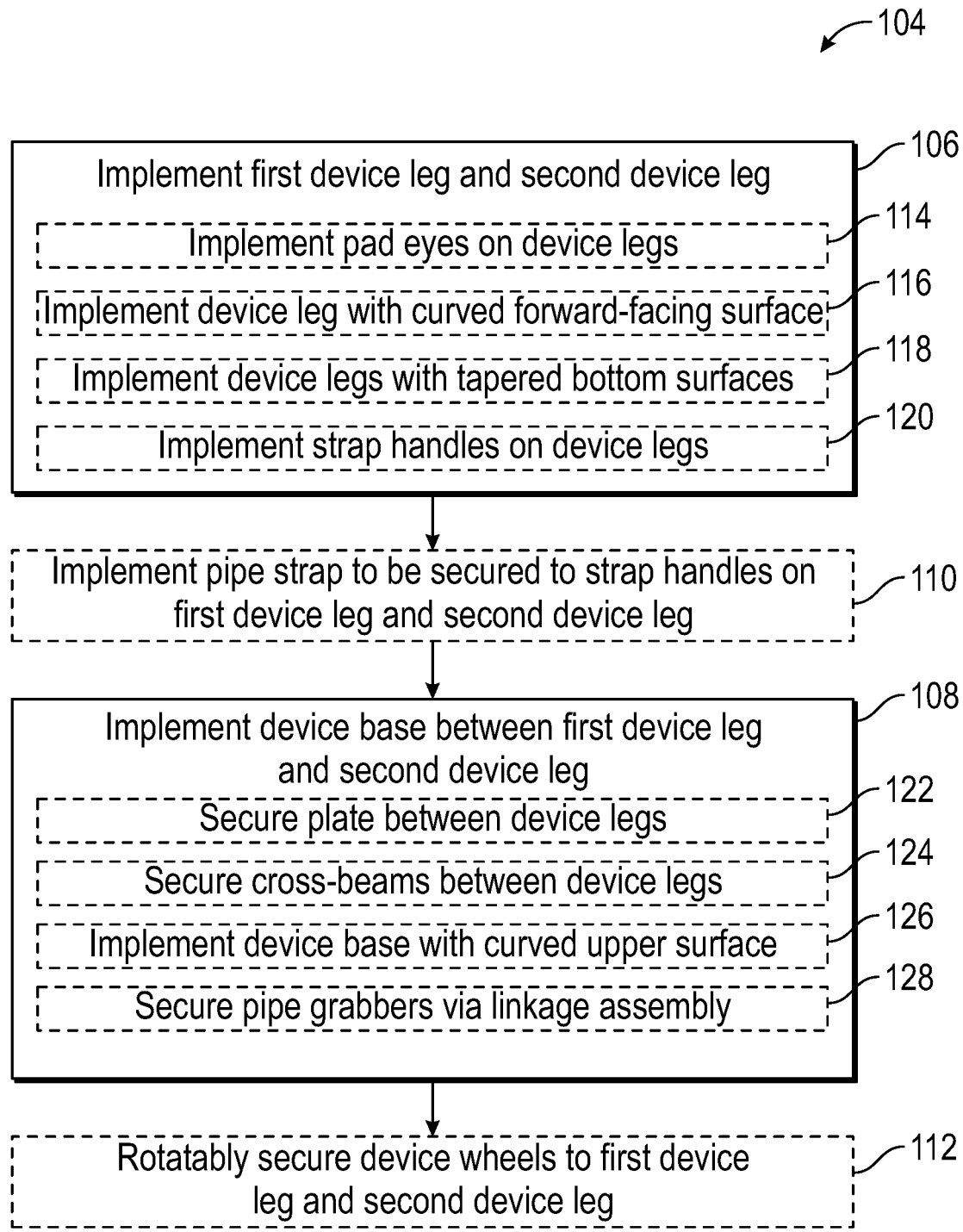
FIG. 11 is a flow diagram of an example of a process for implementing a pulling device included in a pipe deployment system, in accordance with an embodiment of the present disclosure.

To help illustrate, an example of a process 104 for implementing a pulling device 48 included in a pipe deployment system 38 is described in FIG. 11. Generally, the process 104 includes implementing a first device leg and a second device leg (process block 106). Additionally, the process 104 generally includes implementing a device base between the first device leg and the second device leg (process block 108).

Although described in a specific order, which corresponds with an embodiment of the present disclosure, it should be appreciated that the example process 104 is merely intended to be illustrative and not limiting. In particular, in other embodiments, a process 104 for implementing a pulling device 48 may include one or more additional process blocks and/or omit one or more of the depicted process blocks. For example, some embodiments of the process 104 may additionally include implementing a pipe strap to be secured to strap handles on the first device leg and the second device leg (process block 110) while other embodiments of the process 104 do not. As another example, some embodiments of the process 104 may additionally include securing device wheels to the first device leg and the second device leg (process block 112) while other embodiments of the process 104 do not. Moreover, in other embodiments, the depicted process blocks may be performed in a different order, for example, such that the device base is implemented before the first device leg and/or the second device leg are implemented.

In any case, as described above, a (e.g., mid-pipe) pulling device 48 in a pipe deployment system 38 may generally include a first device leg 54 and a second device leg 56. As such, implementing the pulling device 48 may generally include implementing a first device leg 54 and a second device leg 56 (process block 106). In particular, as described above, in some embodiments, each device leg of a pulling device 48 may be implemented to include a plate that is substantially parallel to the plate of the other device leg. Additionally, in some embodiments, each device leg of a pulling device 48 may be implemented at least in part using a composite material and/or metal, such as carbon steel, stainless steel, duplex stainless steel, super duplex stainless steel, or any combination thereof.

Furthermore, as described above, to facilitate exerting pulling force on a pulling device 48 via a pulling cable 52, in some embodiments, the pulling device 48 may include a pad eye 62 implemented on each of its device legs. In other words, in such embodiments, implementing the first device leg 54 and the second device leg 56 of the pulling device 48 may include implementing a pad eye 62 on each of the device legs (process block 114). In particular, in such embodiments, a first pad eye 62A may be implemented on the first device leg 54 to enable a first cable branch 60A of a pulling cable 52 to be secured to the pulling device 48 while a second pad eye 62B may be implemented on the second device leg 56 to enable a second cable branch 60B of the pulling cable 52 to be secured to the pulling device 48, for example, on a forward-facing surface 74 of the first device leg 54 and a forward-facing surface 74 of the second device leg 56, respectively.

Moreover, as described above, in some embodiments, a pulling device 48 may be implemented to have its device legs primarily contact the ground. To facilitate reducing the resistance the pulling device 48 exerts against pulling force exerted thereon, as described above, in some such embodiments, the device legs of a pulling device 48 may each be implemented with a curved forward-facing surface 74. In other words, in such embodiments, implementing the device legs may include implementing the first device leg 54 with a first curved forward-facing surface 74 and implementing the second device leg 56 with a second curved forward-facing surface 74 (process block 116). Additionally or alternatively, to facilitate reducing the resistance a pulling device 48 exerts against pulling force exerted thereon, in some such embodiments, the device legs of the pulling device 48 may each be implemented with a tapered (e.g., wedged) bottom surface 101. In other words, in such embodiments, implementing the device legs may include implementing the first device leg 54 with a first tapered bottom surface 101 and implementing the second device leg 56 with a second tapered bottom surface 101 (process block 118).

However, as described above, in other embodiments, a pulling device 48 may include device wheels 102, which are rotatably secured to its device legs to raise the device legs off of the ground. In other words, in such embodiments, implementing the pulling device 48 may include rotatably securing device wheels 102 to the first device leg 54 and the second device leg 56 (process block 112). For example, a first set of device wheels 102 (e.g., a first device wheel 102A and/or an Nth device wheel 102N) may be rotatably secured to the first device leg 54 while a second set of device wheels (e.g., a second device wheel 102 and/or an N+1th device wheel 102) may be rotatably secured to the second device leg 56.

In any case, as described above, in some embodiments, a pulling device 48 may be secured to a pipe segment 20 via one or more pipe straps 64, which are secured around the outer surface of the pipe segment 20 and to strap handles 66 that are implemented on the device legs of the pulling device 48. In other words, in such embodiments, implementing the first device leg 54 and the second device leg 56 of the pulling device 48 may include implementing one or more strap handles 66 on each of the device legs (process block 120). For example, a first set of strap handles 66 (e.g., a first strap handle 66A and/or an Nth strap handle 66N) may be implemented on a first outward-facing surface 68 of the first device leg 54 while a second set of strap handles 66 (e.g., a second strap handle 66B and/or an N+1th strap handle 66O) may be implemented on a second outward-facing surface 68 of the second device leg 56.

Additionally, in such embodiments, implementing the pulling device 48 may include implementing one or more pipe straps 64 to be secured to the strap handles 66 on the device legs of the pulling device 48 (process block 110). For example, the pulling device 48 may include a first pipe strap 64A, which is implemented to be secured to be secured to a first strap handle 66A on the first device leg 54 and a second strap handle 66B on the second device leg 56, and an Nth pipe strap 64N, which is implemented to be secured to an Nth strap handle 66N on the first device leg 54 and an N+1th strap handle 66O on the second device leg 56. Furthermore, in some such embodiments, a pipe strap 64 of the pulling device 48 may be implemented using webbed material, such as polyester.

In any case, as described above, a (e.g., mid-pipe) pulling device 48 in a pipe deployment system 38 may generally include a device base 58 in addition to its first device leg 54 and its second device leg 56. In particular, as described above, the device base 58 may extend between and be secured to inward-facing surfaces 76 of the device legs such that the device base 58 is relatively perpendicular to the device legs. As such, implementing the pulling device 48 may include implementing a device base 58 between the first device leg 54 and the second device leg 56 of the pulling device 48 (process block 108). As described above, implementing a pulling device 48 in this manner may enable a pipe segment 20, which is to be pulled via the pulling device 48, to be disposed on the device base 58 of the pulling device 48 such that the device legs are on opposites sides of the pipe segment 20 and the outer surface 55 of the pipe segment 20 extends above the top surfaces 57 of the device legs.

Thus, to facilitate securing a pulling device 48 to a pipe segment 20, as described above, in some embodiments, a pipe strap 64 of the pulling device 48 may be secured around the outer surface 55 of the pipe segment 20 as well as to the device legs of the pulling device 48. In particular, tightening the pipe strap 64 may exert a downward force on the pipe segment 20 that compresses the pipe segment 20 between the pipe strap 64 and the device base and, thus, facilitates securing the pulling device 48 to the pipe segment 20. In fact, to facilitate selectively securing a pulling device 48 to a pipe segment 20, in some such embodiments, the pulling device 48 may include one or more rachet assemblies 70, which are each implemented to enable selectively tightening and/or loosening a corresponding pipe strap 64.

In any case, as described above, in some embodiments, the device base 58 of a pulling device 48 may be implemented with one or more plates. In other words, in such embodiments, implementing the device base 58 may include securing one or more plates between the first device leg 54 and the second device leg 56 of the pulling device 48 (process block 122). In particular, in some such embodiments, a plate in the device base 58 may be implemented at least in part using a composite material and/or metal, such as carbon steel, stainless steel, duplex stainless steel, super duplex stainless steel, or any combination thereof.

However, as described above, in some embodiments, the device base 58 of a pulling device 48 may additionally or alternatively be implemented with cross-beams 72, for example, to facilitate reducing the weight of the pulling device 48. In other words, in such embodiments, implementing the device base 58 may include securing cross-beams 72, such as one or more perpendicular cross-beams 72A and/or one or more slanted cross-beams 72B, between the first device leg 54 and the second device leg 56 of the pulling device (process block 124). In particular, in some such embodiments, a cross-beam 72 in the device base 58 may be implemented at least in part using composite material and/or metal, such as carbon steel, stainless steel, duplex stainless steel, super duplex stainless steel, or any combination thereof.

Additionally, as described above, to facilitate reducing the likelihood of a pulling device 48 inadvertently compromising structural integrity of a pipe segment 20, in some embodiments, the device base 58 of the pulling device 48 may be implemented with a curved upper surface 78. In other words, in such embodiments, implementing the device base 58 may include implementing the device base 58 with a curved upper surface 78 (process block 126). In particular, in some such embodiments, the curved upper surface 78 may be directly implemented using the upper surface of one or more cross-beams 72 and/or one or more plates in the device base 58. However, as described above, in other embodiments, the curved upper surface 78 may be implemented via pipe grabbers—namely a first pipe grabber 80 and a second pipe grabber 82—secured on top of a cross-beam 72 and/or a plate in the device base 58.

Moreover, as described above, in some embodiments, the pipe grabbers of a pulling device 48 may not be secured directly to a cross-beam 72 and/or a plate in the device base 58 of the pulling device 48. Instead, in some such embodiments, the pipe grabbers may be secured to the cross-beam 72 and/or the plate of the device base 58 via one or more linkage assemblies 88. In other words, in such embodiments, implementing the device base 58 may include securing a first pipe grabber 80 and a second pipe grabber 82 to a cross-beam 72 and/or a plate in the device base 58 via one or more linkage assemblies 88 (process block 128).

As described above, a linkage assembly 88 in the device base 58 of a pulling device 48 may generally include a first upper linkage arm 94A, which is secured to the first pipe grabber 80 of the pulling device 48 at its first upper end, and a second upper linkage arm 94B, which is pivotably connected to the first upper linkage arm 94A via an upper pivotable fastener 96 and secured to the second pipe grabber 82 of the pulling device 48 at its second upper end. Additionally, as described above, the linkage assembly 88 in the pulling device 48 may generally include a first lower linkage arm 90A and a second lower linkage arm 90B, which are pivotably connected to a cross-beam 72 and/or a plate of the device base 58 via a lower pivotable fastener 92. Furthermore, as described above, the first lower linkage arm 90A may be pivotably connected to the first lower end of the first upper linkage arm 94A via a first side pivotable fastener 98A while the second lower linkage arm 90B may be pivotably connected to the second lower end of the second upper linkage arm 94B via a second side pivotable fastener 98B.

Accordingly, securing the pipe grabbers via the linkage assembly 88 may include pivotably connecting the first lower linkage arm 90A and the second lower linkage arm 90B to a cross-beam 72 and/or a plate of the device base 58 via a lower pivotable fastener 92, such as a nut and bolt pair. Additionally, securing the pipe grabbers via the linkage assembly 88 may include pivotably connecting the first lower linkage arm 90A to the first lower end of the first upper linkage arm 94A via a first side pivotable fastener, such as a nut and bolt pair, and pivotably connecting the second lower linkage arm 90B to the second lower end of the second upper linkage arm 94B via a second side pivotable fastener, such as a nut and bolt pair. Furthermore, securing the pipe grabbers via the linkage assembly 88 may include pivotably connecting the first upper linkage arm 94A and the second upper linkage arm 94B at an intersection point via an upper pivotable fastener 96, such as a nut and bolt pair, securing the first upper end of the first upper linkage arm 94A to the first pipe grabber 80, and the second upper end of the second upper linkage arm 94B to the second pipe grabber 82. In any case, in this manner, a pulling device 48 in a pipe deployment system 38 may be implemented to enable the pipe deployment system 38 to exert pulling force on a pipe segment 20 to be deployed in a pipeline system 10 mid-pipe (e.g., not at end), which, at least in some instances, may facilitate improving pipeline deployment efficiency and/or pipeline operational reliability, for example, at least in part by increasing the pulling force that actually results at a corresponding pipe drum 44 and/or reducing the tensile (e.g., pulling) force absorbed by the pipe segment 20.

Figure 12:
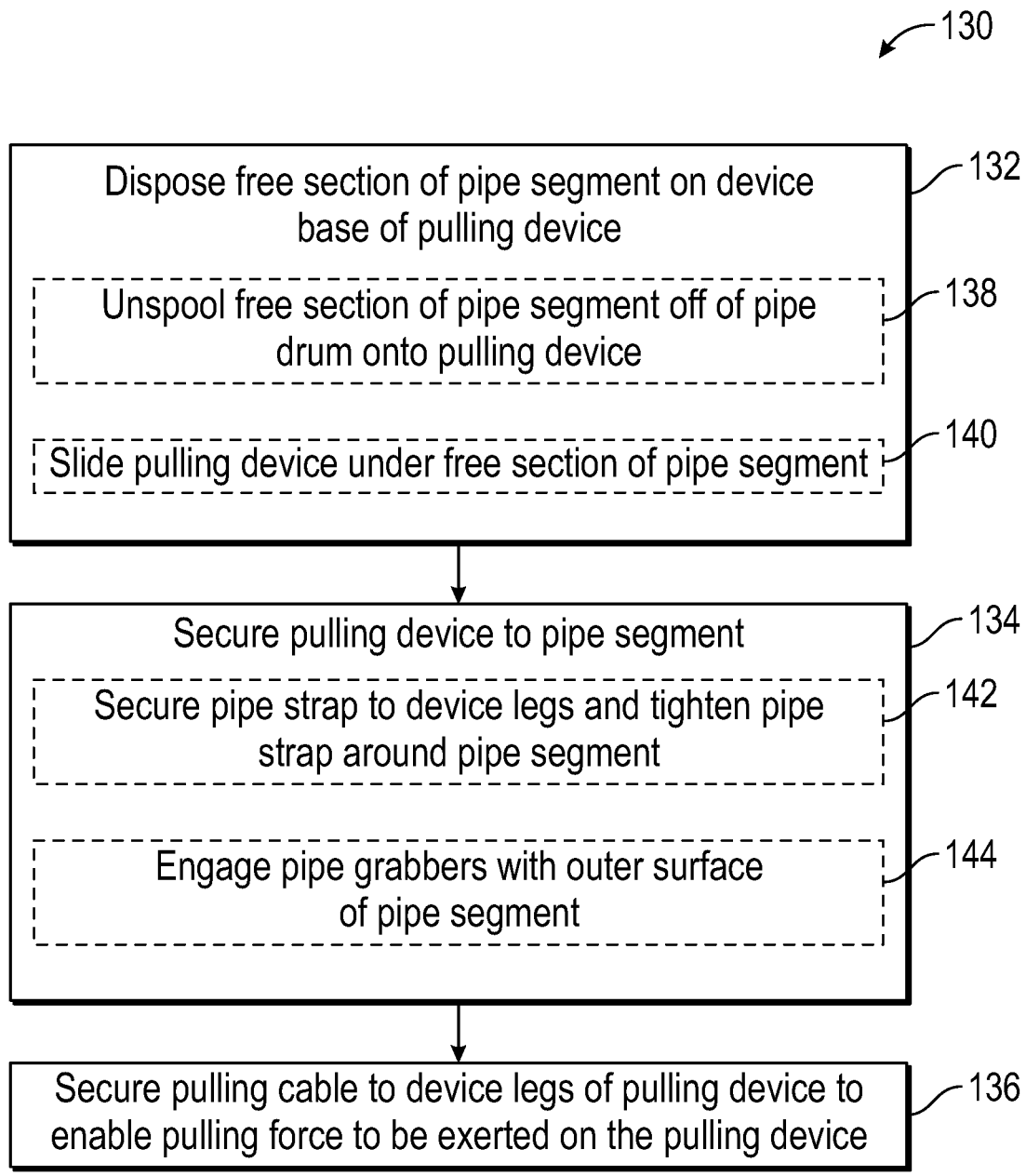
FIG. 12 is a flow diagram of an example of a process for operating a pulling device in a pipe deployment system, in accordance with an embodiment of the present disclosure.

To help further illustrate, an example of a process 130 for operating a (e.g., mid-pipe) pulling device 48 in a pipe deployment system 38 is described in FIG. 12. Generally, the process 130 includes disposing a free section of a pipe segment on a device base of a pulling device (process block 132) and securing the pulling device to the pipe segment (process block 134). Additionally, the process 130 generally includes securing a pulling cable to device legs of the pulling device to enable pulling force to be exerted on the pulling device (process block 136).

Although described in a specific order, which corresponds with an embodiment of the present disclosure, it should be appreciated that the example process 130 is merely intended to be illustrative and not limiting. In particular, in other embodiments, a process 130 for operating a pulling device 48 may include one or more additional process blocks and/or omit one or more of the depicted process blocks. Additionally or alternatively, in other embodiments, the depicted process blocks may be performed in a different order, for example, such that the pulling cable is secured to the device legs of the pulling device before the pulling device is secured to the pipe segment.

In any case, as described above, a (e.g., mid-pipe) pulling device 48 in a pipe deployment system 38 may generally be implemented to have a free (e.g., unspooled) section 50 of a pipe segment 20, which is to be pulled via the pulling device 48, disposed on its device base 58. As such, operating the pulling device 48 may include disposing a free section 50 of the pipe segment 20 on the device base 58 of the pulling device 48 (process block 132). In particular, in some embodiments, the pulling device 48 may initially be disposed proximate (e.g., adjacent) an equipment frame 46 of pipe deployment equipment 42 that is loaded with a pipe drum 44 on which the pipe segment 20 is spooled and, thus, disposing the free section 50 of the pipe segment 20 on the device base 58 may include unspooling (e.g., unwinding and/or unwrapping) the free section of the pipe segment 20 directly from the pipe drum 44 onto the device base 58 of the pulling device 48 (process block 138). However, in other embodiments, the free section 50 of the pipe segment 20 may be disposed on the device base 58 at least in part by sliding the pulling device 48 under the free section 50 of the pipe segment 20 (process block 140).

To enable exerting pulling force on the pipe segment 20 via the pulling device 48, as described above, the pulling device 48 may then be secured to the pipe segment 20 (process block 134). In particular, as described above, to facilitate securing a pulling device 48 to a pipe segment 20, in some embodiments, the pulling device 48 may include one or more pipe straps 64, which are implemented to be secured to device legs of the pulling device 48 and to be secured (e.g., tightened) around the outer surface 55 of the pipe segment 20. In other words, in such embodiments, securing the pulling device 48 to the pipe segment 20 may include securing one or more pipe straps 64 to the first device leg 54 and the second device leg 56 of the pulling device 48 and tightening the one or more pipe straps 64 around the pipe segment 20 (process block 142). In particular, as described above, in some such embodiments, a pipe strap 64 may be secured to the device legs via corresponding strap handles 64 and/or selectively tightened via a corresponding rachet assembly 70.

However, as described above, in some embodiments, a pulling device 48 may additionally or alternatively be secured to a pipe segment 20 via pipe grabbers—namely a first pipe grabber 80 and a second pipe grabber 82. In particular, as described above, the pipe grabbers of the pulling device 48 may be curved pads that open toward one another. Thus, in such embodiments, securing the pulling device 48 to the pipe segment 20 may include moving the first pipe grabber 80 and the second pipe grabber 82 toward one another such that the inner surfaces 86 of the pipe grabbers engage the outer surface 55 of the pipe segment 20 (process block 144).

In particular, as described above, in some such embodiments, movement of the pipe grabbers of a pulling device 48 and, thus, securement of the pulling device 48 to a pipe segment 20 may be manually controlled. For example, in such embodiments, an operator (e.g., user) may operate external equipment, such as an excavator, to selectively move the pipe grabbers of the pulling device 48 toward one another and/or away from one another. However, as described above, in other embodiments, a pulling device 48 may be implemented to autonomously secure itself to a pipe segment 20. For example, in some such embodiments, a linkage assembly 88 of the pulling device 48 may enable weight of a pipe segment 20 disposed on the pipe grabbers of the pulling device 48 to move the pipe grabbers toward one another. In other words, in such embodiments, disposing the free section 50 of the pipe segment 20 on the pipe grabbers in the device base 58 of the pulling device 48 may automatically cause the pipe grabbers to engage the outer surface of the pipe segment 20.

In any case, to enable the pipe deployment system 38 to exert pulling force on the pulling device 48 and, thus, the pipe segment 20 to which the pulling device 48 is secured, a pulling cable 52 may be secured to the device legs of the pulling device 48, for example, while an opposite end of the pulling cable 52 is secured to pulling equipment 40, such as a tow vehicle, in the pipe deployment system 38. As such, operating the pulling device 48 may include securing a pulling cable 52 to its first device leg 54 and to its second device leg 56 (process block 136). For example, a first cable branch 60A of the pulling cable 52 may be secured to a first pad eye 62A on the first device leg 54 while a second cable branch 60B of the pulling cable 52 may be secured to a second pad eye 62B on the second device leg 56. In this manner, implementing and/or operating a pulling device in a pipe deployment system in accordance with the techniques described in the present disclosure may enable the pipe deployment system to exert pulling force on a pipe segment mid-pipe (e.g., not at free end), which, at least in some instances, may facilitate improving pipeline deployment efficiency and/or pipeline operational reliability, for example, at least in part by increasing the pulling force that actually results at a corresponding pipe drum and/or reducing the tensile (e.g., pulling) force absorbed by the pipe segment.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe deployment system comprising:
   pipe deployment equipment, wherein a pipe drum having spooled thereon a pipe segment comprising tubing that defines a pipe bore and a fluid conduit within an annulus of the tubing is configured to be loaded on the pipe deployment equipment; and
   a pulling device configured to be secured to an unspooled section of the pipe segment to enable pulling equipment secured to the pulling device via a pulling cable to exert pulling force on the pipe segment, wherein the pulling device comprises:
   a first device leg;
   a second device leg parallel to the first device leg; and
   a device base extending between and secured to a first inward-facing surface of the first device leg and a second inward-facing surface of the second device leg such that the device base is perpendicular to the first device leg and the second device leg and the device base is raised relative to a first bottom surface of the first device leg and a second bottom surface of the second device leg, wherein:
   the unspooled section of the pipe segment is configured to be disposed on the device base to facilitate securing the pulling device to the pipe segment; and
   the device base of the pulling device comprises:
   a curved upper surface;
   a cross-beam or a plate extending between and secured to the first inward-facing surface of the first device leg and the second inward-facing surface of the second device leg; and
   a first pipe grabber and a second pipe grabber secured on top of the cross-beam or the plate to implement the curved upper surface of the device base.

2. The pipe deployment system of claim 1, wherein the pulling device comprises:
   a first strap handle implemented on a first outward-facing surface of the first device leg;
   a second strap handle implemented on a second outward-facing surface of the second device leg; and
   a pipe strap configured to be secured to the first strap handle, the second strap handle, and around an outer surface of the unspooled section of the pipe segment to facilitate securing the pulling device to the pipe segment.

3. The pipe deployment system of claim 2, wherein the pulling device comprises a rachet assembly configured to enable selectively tightening the pipe strap around the outer surface of the unspooled section of the pipe segment.

4. The pipe deployment system of claim 1, wherein:
   the first pipe grabber of the pulling device comprises a first curved pad; and
   the second pipe grabber of the pulling device comprises a second curved pad that opens toward the first curved pad.

5. The pipe deployment system of claim 1, wherein the pulling device is configured to be secured to the pipe segment at least in part by moving the first pipe grabber and the second pipe grabber toward one another such that a first inner surface of the first pipe grabber and a second inner surface of the second pipe grabber engage an outer surface of the pipe segment.

6. The pipe deployment system of claim 1, wherein the device base of the pulling device comprises a linkage assembly that secures the first pipe grabber and the second pipe grabber to the cross-beam or the plate of the device base.

7. The pipe deployment system of claim 6, wherein the linkage assembly of the pulling device is configured to cause a first inner surface of the first pipe grabber and a second inner surface of the second pipe grabber to engage an outer surface of the pipe segment when the unspooled section of the pipe segment is disposed on the device base of the pulling device.

8. The pipe deployment system of claim 1, wherein:
   the first device leg of the pulling device comprises a first pad eye configured to enable a first cable branch of the pulling cable to be secured to the first device leg; and
   the second device leg of the pulling device comprises a second pad eye configured to enable a second cable branch of the pulling cable to be secured to the second device leg.

9. A pulling device in a pipe deployment system, comprising:
   a first device leg, wherein the first device leg comprises:
   a first plate;
   a first strap handle implemented on a first outward-facing surface of the first plate; and
   a first pad eye configured to enable a first cable branch of a pulling cable to be secured to the pulling device;
   a second device leg, wherein the second device leg comprises:
   a second plate;
   a second strap handle implemented on a second outward-facing surface of the second plate; and a second pad eye configured to enable a second cable branch of the pulling cable to be secured to the pulling device;

a device base secured to the first plate of the first device leg and the second plate of the second device leg to enable a free section of a pipe segment to be pulled via the pulling device to be disposed on the device base, wherein the device base comprises a cross-beam that extends between and is secured to a first inward-facing surface of the first plate of the first device leg and a second inward-facing surface of the second plate of the second device leg; and a pipe strap is configured to be secured to the first strap handle, to the second strap handle, and around an outer surface of the free section of the pipe segment to facilitate securing the pulling device to the pipe segment.

10. The pulling device of claim 9, wherein the device base comprises a first curved pad and a second curved pad that are secured on top of the cross-beam, wherein:

the first curved pad and the second curved pad open toward one another; and the first curved pad and the second curved pad are configured to be move toward one another such that a first inner surface of the first curved pad and a second inner surface of the first curved pad engage an outer surface of the free section of the pipe segment to facilitate securing the pulling device to the pipe segment.

11. A pulling device in a pipe deployment system, comprising:

a first device leg, wherein the first device leg comprises a first plate and a first pad eye configured to enable a first cable branch of a pulling cable to be secured to the pulling device;

a second device leg, wherein the second device leg comprises a second plate and a second pad eye configured to enable a second cable branch of the pulling cable to be secured to the pulling device; and a device base secured to the first plate of the first device leg and the second plate of the second device leg to enable a free section of a pipe segment to be pulled via the pulling device to be disposed on the device base, wherein the device base comprises:

a cross-beam that extends between and is secured to a first inward-facing surface of the first plate of the first device leg and a second inward-facing surface of the second plate of the second device leg;

a first curved pad and a second curved pad that are secured on top of the cross-beam, wherein:

the first curved pad and the second curved pad open toward one another; and the first curved pad and the second curved pad are configured to be moved toward one another such that a first inner surface of the first curved pad and a second inner surface of the first curved pad engage an outer surface of the free section of the pipe segment to facilitate securing the pulling device to the pipe segment; and a linkage assembly that secures the first curved pad and the second curved pad to the cross-beam, wherein the linkage assembly comprises:

a first upper linkage arm that is secured to the first curved pad at a first upper end of the first upper linkage arm;

a second upper linkage arm that is secured to the second curved pad at a second upper end of the second upper linkage arm and that is pivotably connected to the first upper linkage arm at an intersection point via an upper pivotable fastener;

a first lower linkage arm that is pivotably connected to a first lower end of the first upper linkage arm via a first side pivotable fastener; and a second lower linkage arm that is pivotably connected to a second lower end of the second upper linkage arm via second side pivotable fastener, wherein the second lower linkage arm and the first lower linkage arm are pivotably connected to the cross-beam via a lower pivotable fastener.

\* \* \* \* \*